US008424496B2

(12) United States Patent
Pursifull

(10) Patent No.: US 8,424,496 B2
(45) Date of Patent: Apr. 23, 2013

(54) METHODS AND SYSTEMS FOR STARTING A VEHICLE ENGINE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1038 days.

(21) Appl. No.: 12/364,721

(22) Filed: Feb. 3, 2009

(65) Prior Publication Data
US 2010/0192879 A1 Aug. 5, 2010

(51) Int. Cl.
*F02B 43/08* (2006.01)
*F02B 63/00* (2006.01)
*F02B 43/00* (2006.01)

(52) U.S. Cl.
USPC ............... 123/3; 123/1 A; 123/2; 123/DIG. 2

(58) Field of Classification Search ................. 123/1 A, 123/2, 3, DIG. 2
See application file for complete search history.

(56) References Cited

U.S. PATENT DOCUMENTS

| | | | | |
|---|---|---|---|---|
| 3,311,097 | A | * | 3/1967 | Mittelstaedt .................. 123/537 |
| 3,946,711 | A | * | 3/1976 | Wigal ............................ 123/536 |
| 5,231,954 | A | * | 8/1993 | Stowe ................................ 123/3 |
| 5,458,095 | A | * | 10/1995 | Post et al. .......................... 123/3 |
| 5,687,682 | A | | 11/1997 | Rembold et al. |
| 5,813,222 | A | * | 9/1998 | Appleby ........................... 60/274 |
| 5,964,089 | A | * | 10/1999 | Murphy et al. .................. 60/286 |
| H001820 | H | * | 12/1999 | Graves et al. ................... 123/557 |
| 6,036,827 | A | * | 3/2000 | Andrews et al. ............... 204/252 |
| 6,257,175 | B1 | * | 7/2001 | Mosher et al. ..................... 123/3 |
| 6,332,434 | B1 | * | 12/2001 | De Souza et al. .................. 123/3 |
| 6,336,430 | B2 | * | 1/2002 | de Souza et al. ................... 123/3 |
| 6,427,639 | B1 | * | 8/2002 | Andrews et al. ................... 123/3 |
| 6,689,259 | B1 | * | 2/2004 | Klein .......................... 204/230.5 |
| 6,698,389 | B2 | * | 3/2004 | Andrews et al. ............ 123/41.31 |
| 7,143,722 | B2 | * | 12/2006 | Ross .................................... 123/3 |
| 7,146,960 | B2 | * | 12/2006 | Phlips et al. .................. 123/179.4 |
| 7,191,737 | B2 | * | 3/2007 | Klein ................................. 123/3 |
| 7,191,756 | B2 | * | 3/2007 | Phlips et al. .................... 123/366 |
| 7,255,081 | B2 | * | 8/2007 | Sieber et al. .............. 123/179.17 |
| 7,533,651 | B2 | * | 5/2009 | Surnilla ............................ 123/304 |
| 7,721,710 | B2 | * | 5/2010 | Leone et al. .................... 123/431 |

(Continued)

FOREIGN PATENT DOCUMENTS

JP 01155031 A * 6/1989
WO 2007/101329 9/2007

OTHER PUBLICATIONS

Duane Card; Dec. 2, 2008; http://www.duanecard.com/hydrogen/hydrogen.html.*
Jun. 16, 1989; JP 01155031 A—Abstract translation.*

*Primary Examiner* — Rinaldi Rada
*Assistant Examiner* — Tea Holbrook
(74) *Attorney, Agent, or Firm* — Julia Voutyras; Alleman Hall McCoy Russell & Tuttle LLP

(57) ABSTRACT

Methods and systems for starting a vehicle engine are provided. One example method for starting a vehicle engine having a plurality of cylinders may include generating hydrogen gas and oxygen gas onboard the vehicle from water. The method may further include maintaining the hydrogen gas and oxygen gas together as a gaseous mixture. The method may further include injecting the gaseous mixture to at least one cylinder of the engine during a start.

17 Claims, 4 Drawing Sheets

U.S. PATENT DOCUMENTS

| | | |
|---|---|---|
| 8,127,750 B2 * | 3/2012 | Klein et al. .................... 123/575 |
| 2004/0173165 A1 * | 9/2004 | Sieber et al. ....................... 123/3 |
| 2006/0219190 A1 * | 10/2006 | Balan et al. ........................ 123/3 |
| 2006/0254564 A1 * | 11/2006 | Lewis et al. ................... 123/491 |
| 2008/0047830 A1 | 2/2008 | Fairfull et al. |
| 2008/0092831 A1 | 4/2008 | Simon |
| 2008/0190383 A1 * | 8/2008 | Lin .................................... 123/3 |
| 2008/0283023 A1 * | 11/2008 | Lewis et al. ................... 123/344 |

* cited by examiner

METHODS AND SYSTEMS FOR STARTING A VEHICLE ENGINE

FIELD

This application relates to starting an engine of a vehicle from rest using a gaseous mixture including hydrogen gas and oxygen gas.

BACKGROUND AND SUMMARY

Most hydrocarbon emissions from vehicle engines are created during an engine start, particularly before the vehicle catalyst is warm. The use of alternative fuels, such as those including alcohol, can help to reduce hydrocarbon emissions. However, starting a vehicle with such fuels can be difficult due to the low volatility of the fuel, especially in cold weather. Thus, a number of methods may be used to achieve reliable start of the engine while reducing emissions. Some example methods include starting an engine with hydrogen gas, which is a gas in any terrestrial condition, and has high volatility while producing minimal start emissions.

One example of an engine using hydrogen gas during a direct start is described in Cerny et al. in WO 2007/101,329. Cerny et al. describe a system including an electrolysis system for producing hydrogen gas and oxygen gas from water. The hydrogen gas is directed along a line to a storage reservoir, from which hydrogen gas may be directed to the engine or intake manifold for subsequent combustion. The oxygen gas is directed along a separate line, to either be vented to the atmosphere or injected into vehicle engine cylinders.

The inventors herein have recognized potential issues with such an approach. As one example, separation of the hydrogen gas and oxygen gas, and direction of these gasses along separate lines, may require several extra components, thereby increasing the number of components and/or space required for the system. Further, following the above approach, any inaccuracies in the delivery of the hydrogen and/or oxygen may lead to inaccurate ratios of constituents in the combustion chamber, and thus may increase emissions.

Some of the above issues may be addressed by a method for starting a vehicle engine having a plurality of cylinders. The method may include generating hydrogen gas and oxygen gas onboard the vehicle from water, and maintaining the hydrogen gas and oxygen gas together as a gaseous mixture. The method may further include injecting the gaseous mixture to at least one cylinder of the engine during an engine start. In particular example, the oxygen gas and hydrogen gas are maintained together from the generation to delivery to a cylinder.

This method has the potential benefits of reducing hydrocarbon emissions while achieving reliable engine starting. By maintaining the hydrogen gas and oxygen gas together, a known stoichiometric ratio of the gasses (e.g., Brown's gas, oxyhydrogen) with good combustibility and low emissions is ready for injection to the engine during a start, such as a direct start. The gaseous mixture has minimal hydrocarbon emissions and thus particularly complements vehicle engines employing alcohol fuels, and/or other alternative fuels with low hydrocarbon emissions but low volatility. Further, by maintaining the hydrogen gas and oxygen gas together as a gaseous mixture ready for injection to the engine, the number of components needed for control and delivery of the gaseous mixture to the engine may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF FIGURES

Figure 1:
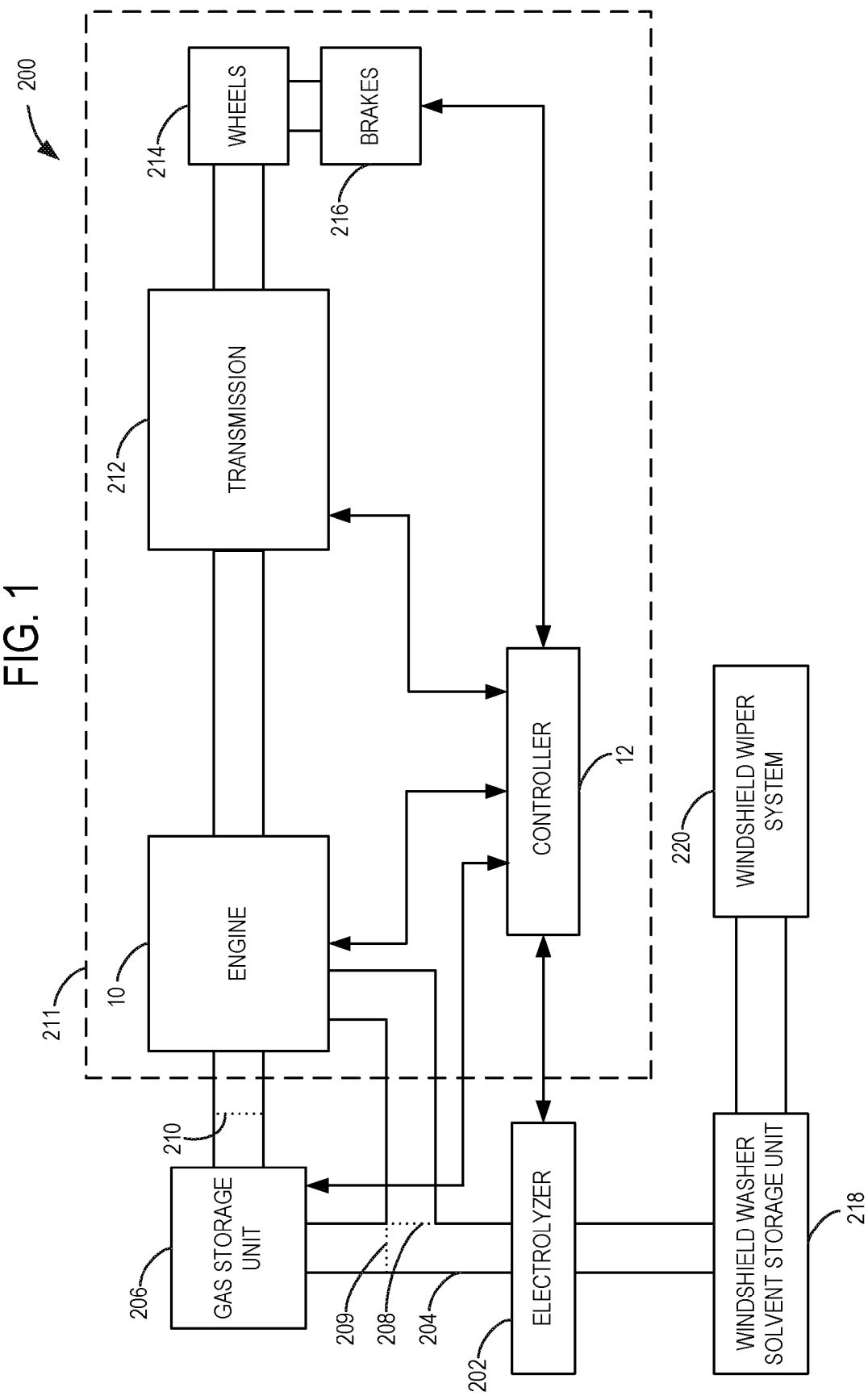
FIG. 1 is a schematic view of a system for start of an engine of a vehicle.
Figure 2:
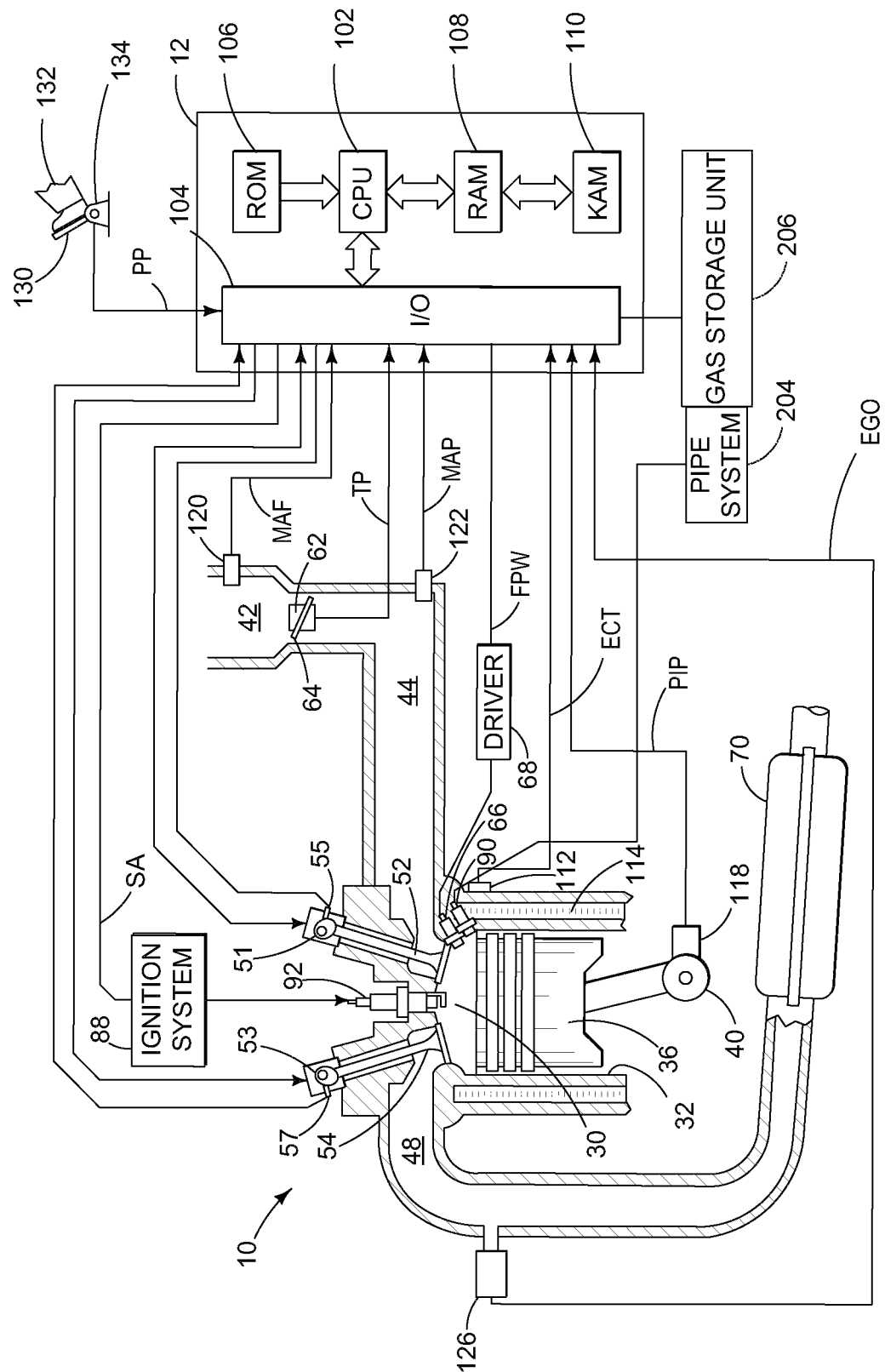
FIG. 2 is a schematic view of a cylinder of an engine.

Systems and methods for starting an engine of a vehicle are herein provided. An exemplary system, including an electrolyzer, configured to provide a gaseous mixture to an engine to thereby fuel a powertrain of the vehicle is shown in FIG. 1, and a schematic view of a cylinder of the engine is shown in FIG. 2. A method for generating, storing, and delivering the gaseous mixture to the engine is shown as a flowchart in FIG. 3, and additional method details are illustrated in FIG. 4.

Referring now to FIG. 1, it shows a block diagram schematic of an exemplary system 200 for start of an engine of a vehicle. The system 200 may include an electrolyzer 202 onboard the vehicle configured to generate diatomic hydrogen gas and diatomic oxygen gas from water. The system may also include a pipe system 204 configured to maintain a gaseous mixture including a stoichiometric combination of the diatomic hydrogen gas and the diatomic oxygen gas. This stoichiometric combination is sometimes referred to as Brown's gas, or oxyhydrogen. The pipe system 204 may deliver the gaseous mixture for injection to the engine 10 during the direct start.

As shown, the system may also include a gas storage unit 206 configured to store the gaseous mixture, for later use, in some examples. The gas storage unit 206 may be a pressurized container enhanced with adsorptive storage, in some examples. Thus, the pipe system 204 may also deliver the gaseous mixture to the gas storage unit 206, and may include one or more valves 208, 209, 210 to control flow from the electrolyzer 202 to the engine 10, from the electrolyzer to the gas storage unit 206, and from the gas storage unit 206 to the engine 10 respectively, based on various engine operating parameters. Valves 208, 209, and 210 are illustrated simply for clarity; it may be appreciated that other types of valve system with one or more valves configured to selectively direct flow of the gaseous mixture from an electrolyzer to a gas storage unit and/or engine, and/or from a gas storage unit to an engine may be employed.

In one example embodiment, the gaseous mixture is delivered to at least one cylinder of the engine 10 for injection on a power stroke during an engine start (such as for a first combustion event of a direct start in one example) to achieve reliable start of the engine. That is, the injection is executed when at least one cylinder of the vehicle engine is positioned with the piston, and intake and exhaust values, on a power stroke before engine rotation of the start (e.g., direct start), in one example. Further still, when the injection is executed for a first combustion event during the start, combustion of the gaseous mixture may generate an initial rotation of the engine from rest.

A powertrain 211 includes the engine 10 coupled to a transmission 212. The transmission 212 transmits torque to wheels 214, which are in turn, coupled to wheel brakes 216.

The system may also include an electronic controller 12 configured to communicate reciprocally with the elements of the system 200. The electronic controller 12 may, for example, receive a signal from the gas storage unit 206 regarding the amount of gaseous mixture being stored in the gas storage unit 206. Thus, it may be appreciated that the electronic controller 12 may send a signal to the electrolyzer 202 to generate the hydrogen gas and the oxygen gas when an amount of the gaseous mixture in the gas storage unit 206 is below a predetermined low threshold, in one example.

A liquid fuel, such as gasoline or ethanol, may be used before, during and/or after the injection of the gaseous mixture during an engine start. The amount of the gaseous mixture injected into the cylinder(s) of the engine 10 can affect the temperature and volatility of the contents of the engine cylinder(s) during a combustion event. Thus, the fuel pulse width of the liquid fuel, the fuel injection timing of the gaseous mixture and/or the liquid fuel, and/or the spark timing of a combustion event may be adjusted based on an amount of the gaseous mixture injected. Said adjustments may be controlled by the electronic controller 12, based on a gaseous mixture amount signal received at the electronic controller 12. In one example, the adjustments compensate for the increase in the cylinder contents' volatility achieved with an increase in the amount of the injected gaseous mixture (e.g., Brown's gas, oxyhydrogen). For example, it may be appreciated that the fuel pulse width for the liquid fuel injection may be reduced during the start when the amount of the gaseous mixture injected is increased, and the fuel pulse width for the liquid fuel injection may be increased during the engine start when the amount of the gaseous mixture injected is reduced. In another example, the fuel injection timing of the gaseous mixture and/or the liquid fuel may be retarded during the start as the amount of the gaseous mixture injected is increased, and the fuel injection timing may be advanced as the amount of the gaseous mixture injected is reduced. Further still, the spark timing may be retarded as the amount of the gaseous mixture injected is increased, and the spark timing may be advanced as the amount of the gaseous mixture injected is reduced. With these controls, combustion can be made to occur at a desired timing, such that efficient and low emission engine combustion is achieved during the engine start.

It may be appreciated that operation during an engine start may include operation before a first combustion event from rest, during a first combustion event from rest, before a plurality of combustion events from rest, during engine cranking, during engine run-up, and/or during a transition from engine run-up to engine idle operation.

In one embodiment, the electrolyzer 202 may be configured to generate the hydrogen gas and the oxygen gas under pressure, and the pipe system 204 and the gas storage unit 206 may be configured to maintain the gaseous mixture under pressure. By doing so, it is possible to achieve a desired fuel injection pressure without a need for additional pressurizing components or controls, although such components and/or controls may be included, if desired.

To further reduce the number of components for the system 200, the water supply to the electrolyzer 202 can be extracted from a windshield washer solvent storage unit 218, including windshield wiper fluid for example, associated with a windshield wiper system 220.

Referring now to FIG. 2, a schematic diagram shows one cylinder of multi-cylinder engine 10, which may be included in a propulsion system of a vehicle. Engine 10 may be controlled at least partially by a control system including electronic controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate automatic transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by electronic controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel, such as the liquid fuel described above, directly therein in proportion to the pulse width of signal FPW received from electronic controller 12 via electronic driver 68. In this manner, fuel injector 66 provides what is known as direct injection of fuel into combustion chamber 30. The fuel injector may be mounted on the side of the combustion chamber or in the top of the combustion chamber, for example. Fuel may be delivered to fuel injector 66 by a fuel delivery system (not shown) including a fuel tank, a fuel pump, and a fuel rail. Fuel injector 66 may also be configured as a PFI system. That is, in some embodiments, combustion chamber 30 may alternatively or additionally include a fuel injector arranged in intake passage 42 in a configuration that provides what is known as port injection of fuel into the intake port upstream of combustion chamber 30.

An additional fuel injector 90 (for a gaseous fuel injection system) may be provided in one or more cylinders for injection of the gaseous mixture described herein (e.g., Brown's gas, oxyhydrogen). The additional fuel injector 90 may be positioned to directly inject a gaseous mixture to the combustion chamber. Fuel injector 90 may be coupled to the gaseous storage unit 206 and/or directly to the electrolyzer 202 via the pipe system 204. Further, the electrolyzer 202, fuel injector 90, and/or several valves (e.g., 208, 209, 210) controlling flow of the gaseous mixture in the pipe system 204 may be controlled by the electronic controller 12.

The gaseous fuel injection system may also be configured to inject other gaseous fuels (e.g., methane). In such a case, during idle or key-off, the gaseous fuel injection system is made ready for a subsequent direct start using a gaseous mixture including diatomic hydrogen gas and diatomic oxygen gas. It may be appreciated that, in a case where a gaseous mixture is used for an assisted direct start, the additional (gaseous) fuel injector 90 may be positioned to inject a gaseous mixture to the intake manifold (e.g., port fuel injection system), or directly to the cylinder (e.g., direct injection system), dependent on engine operating conditions.

Intake passage 42 may include a throttle 62 having a throttle plate 64. In this particular example, the position of throttle plate 64 may be varied by electronic controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to electronic controller 12 by throttle position signal TP. Intake passage 42 may include a mass air flow sensor 120 and a manifold air pressure sensor 122 for providing respective signals MAF and MAP to electronic controller 12.

Ignition system 88 can provide an ignition spark to combustion chamber 30 via spark plug 92 in response to spark advance signal SA from electronic controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Converter 70 can be a three-way type catalyst in one example.

Electronic controller 12 is shown in FIG. 2 as a microcomputer, including microprocessor 102, input/output ports 104, an electronic storage medium for executable programs and calibration values shown as read-only memory 106 in this particular example, random access memory 108, keep alive memory 110, and a data bus. The electronic controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from manifold air pressure sensor 122. Storage medium read-only memory 106 can be programmed with computer readable data representing instructions executable by microprocessor 102 for performing the methods described below as well as variations thereof.

As described above, FIG. 2 shows one cylinder of a multi-cylinder engine, and each cylinder may similarly include its own set of intake/exhaust valves, fuel injector, spark plug, etc.

Figure 3:
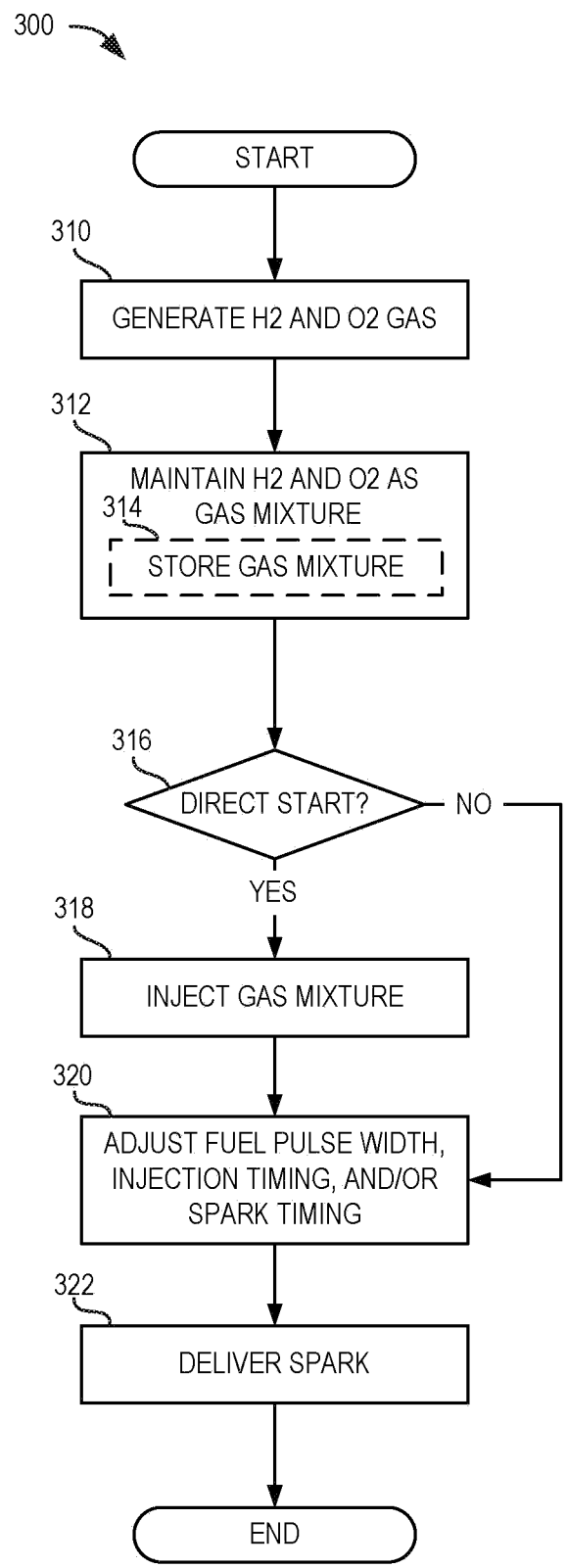
FIG. 3 is a high-level flowchart illustrating a method for starting a vehicle engine having a plurality of cylinders.
Figure 4:
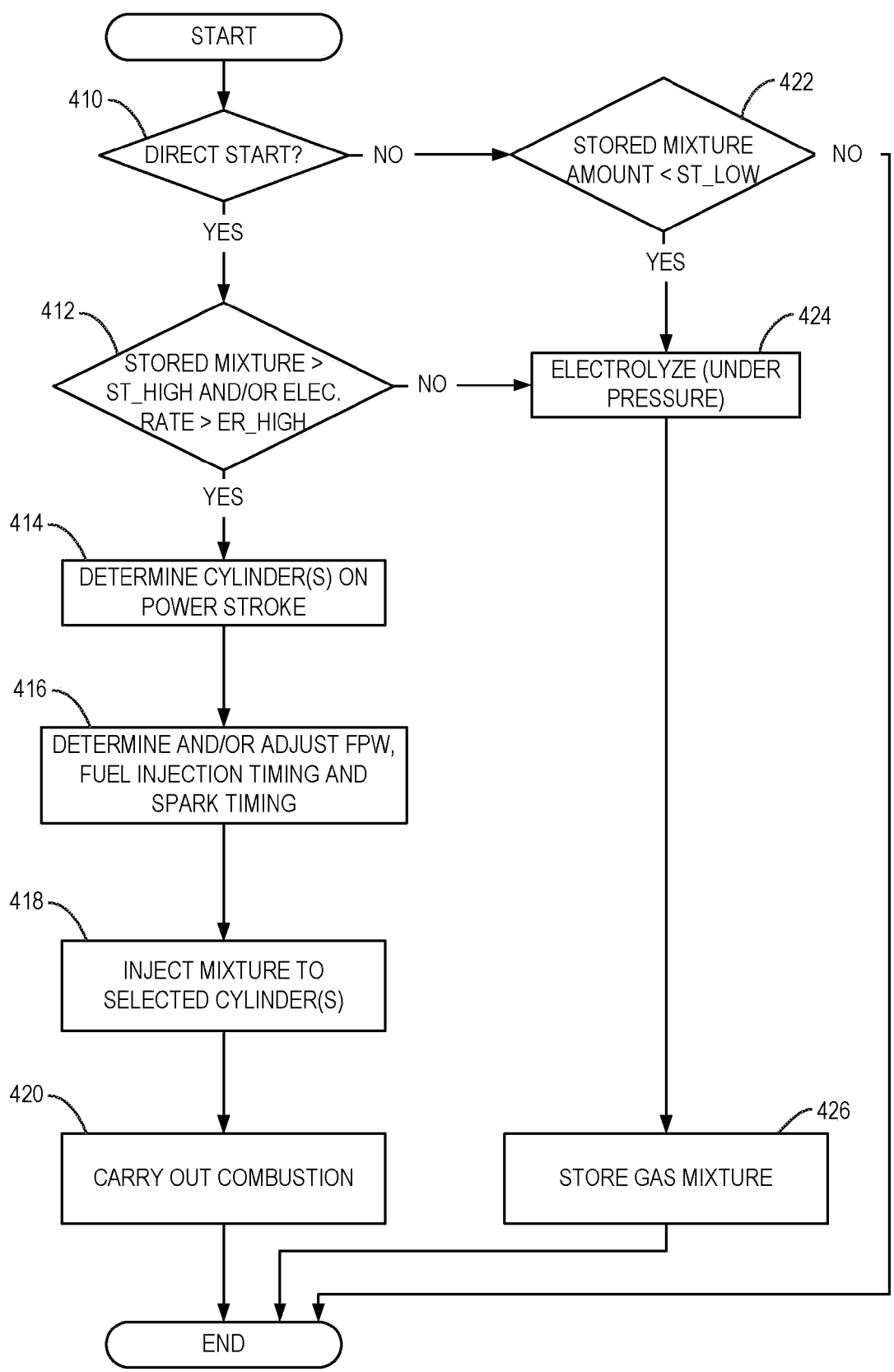
FIG. 4 is a detailed flowchart illustrating a method for starting a vehicle engine.

Referring now to FIG. 3, a high level flowchart illustrating a method 300 for starting a vehicle engine having a plurality of cylinders is provided. At 310, the method 300 includes generating hydrogen gas and oxygen gas onboard the vehicle, from water, or a water-containing substance, such as windshield wiper fluid.

The method may also include maintaining the hydrogen gas and oxygen gas together as a gaseous mixture at 312, without drawing off one or both of the generated hydrogen gas and oxygen gas, and without added extraneous gasses, such as atmospheric gas. This may include maintaining the gas mixture in a pipe system, and/or storing the gas mixture in a gas storage unit at 314, for later use in some examples. In one example, the gaseous mixture is a stoichiometric combination of diatomic hydrogen gas and diatomic oxygen gas.

At 316, it is determined if start conditions, and in particular direct start conditions, are met. Direct start conditions may include, as some examples, driver release of the brake pedal, driver tip-in of the acceleration pedal, or exceeding a predetermined time threshold in idle stop, where the vehicle operates in a start-stop mode of operation. If direct start conditions are met at 316, the gaseous mixture is injected to at least one cylinder of the engine during the start; in one example, the gaseous mixture is injected to a cylinder positioned in a power stroke, where the cylinder is combusted with the engine at rest to be a first combusting cylinder, to thereby start rotation of the engine. Thus, it may be appreciated that the gaseous mixture may be injected for a first combustion event during a direct start. A first combustion event may be the first combustion event from engine off, and/or the first combustion event from the engine at idle stop. However, the gaseous mixture may also be injected during engine starts at other combustion events, to a plurality of cylinders, and/or for a predetermined number of combustion events (e.g., a second or later combustion event in each cylinder of the engine during a starter-motor assisted engine start). For example, injection may be executed before the first combustion event from engine off, during the first combustion event from engine off, and/or after a predetermined number of combustion events from engine off.

Further, injection of the gaseous mixture may be executed at various portions of the engine start. An engine start may include one or more of engine cranking (e.g., via a starter), engine run-up, and/or engine transition to idle speed, etc. Further, the injection of the gaseous mixture may occur before, during, or after engagement of an electric starter motor during an engine start. However, in one example, the injection of the gaseous mixture occurs in the absence of use of an electric starter motor (e.g., during a direct start) to reduce hydrocarbon emissions.

As discussed above, the injection of an amount of the gaseous mixture can affect the temperature and volatility of the contents of the cylinder, as well as the requirements for liquid fuel injection (e.g., a liquid fuel such as gasoline). As such, fuel pulse width, injection timing, and/or spark timing can be adjusted at 320, based on the amount and/or timing of the gaseous mixture injected. For example, as a greater amount of the gaseous mixture is injected, a smaller amount of fuel injection may be scheduled and delivered. At 322, the method includes delivering the spark so as to ignite the cylinder contents.

It may be appreciated that methane gas can be injected as a second gaseous fuel during an engine start, for example, if an amount of the gaseous mixture of diatomic hydrogen and oxygen gasses for injection is insufficient (e.g., too small) for achieving a successful start. Windshield washer solvent, which contains approximately 40% methanol, can both provide the water for onboard generation of hydrogen gas and oxygen gas, as well as the methane gas. That is, when methanol is heated, it is broken down into other molecules including diatomic hydrogen and methane. Various systems for heating methanol with exhaust heat, as well as reformers of methanol, ethanol, or gasoline, may be used.

Referring now to FIG. 4, a more detailed flowchart illustrating an exemplary method 400 for direct starting a vehicle engine is provided. At 410, it is determined if direct start conditions are met. If the answer is yes at 410, it is determined if the amount of stored gaseous mixture in a gas storage unit is above a high threshold ST_HIGH and/or if the electrolysis rate is above a high threshold ER_HIGH at 412. If so, there is a sufficient amount of the gaseous mixture to achieve a direct start of an engine. Thus, at 414, the one or more cylinders positioned to perform a power stroke are determined, and the fuel pulse width of a liquid fuel type, fuel injection timing of the gaseous mixture and/or the liquid fuel type, and/or spark timing are determined and/or adjusted at 416. As discussed above, the fuel pulse width may be reduced, and the fuel injection timing and/or the spark timing may be retarded as the amount of the injected gaseous mixture increases. At 418, the gaseous mixture may be delivered from either the electrolyzer or a gas storage unit to the engine via the pipe system, and injected to the selected cylinder(s) positioned to perform the power stroke at 418. Combustion is carried out at 420.

Although the application describes a method for performing an engine direct start, it may be appreciated that an assisted direct start may be desirable under some conditions (e.g., during low engine and/or low ambient temperatures, such as below 20 degrees F.). Thus, 420 may include the use of an electric starter motor, injection of additional, high-volatility fuels and/or liquid fuels, and/or other actions to facilitate combustion.

If the answer is no at 410, (direct start conditions are not met), it is determined at 422 if the amount of stored gaseous mixture in a gas storage unit and/or a pipe system is below a predetermined low threshold ST_LOW. If the answer is yes at 422, a signal to electrolyze water under pressure may be sent by an electronic controller to the electrolyzer to begin generation of the gaseous mixture at 424. That is, diatomic hydrogen gas and diatomic oxygen gas may be generated under pressure in an electrolyzer, and the stoichiometric gaseous mixture of the hydrogen gas and oxygen gas can be subsequently maintained under pressure in a pipe system connected to the electrolyzer. The produced gaseous mixture can be delivered from the electrolyzer via the pipe system, to be stored in a gas storage unit for example, at 426. If the answer is no at 422, electrolysis may end, and the routine may end.

If the answer is no at 412 (e.g., direct start conditions are met but there is insufficient stored gaseous mixture or it is being produced at an insufficient rate), the routine proceeds to 424.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As such, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for starting a vehicle engine, comprising:
generating hydrogen gas and oxygen gas onboard the vehicle from water;
maintaining the hydrogen gas and oxygen gas together as a stoichiometric mixture combination of diatomic hydrogen gas and diatomic oxygen gas; and
during engine starting: injecting an amount of the stoichiometric mixture to an engine cylinder, injecting a liquid fuel, retarding spark timing as the amount increases, and advancing spark timing as the amount reduces.

2. The method of claim 1, wherein the hydrogen gas and the oxygen gas are generated under pressure in an electrolyzer, and the stoichiometric mixture is maintained under pressure.

3. The method of claim 1, wherein the injecting of the stoichiometric mixture includes injecting the stoichiometric mixture to the engine cylinder of the vehicle engine positioned with a piston, and intake and exhaust valves on a power stroke before engine rotation of the start.

4. The method of claim 1, wherein the injecting of the stoichiometric mixture includes injecting the stoichiometric mixture for a first combustion event during the engine starting, where combustion of the stoichiometric mixture generates an initial rotation of the engine from rest.

5. The method of claim 1, further comprising storing the stoichiometric mixture in a gas storage unit.

6. The method of claim 5, further comprising generating the stoichiometric mixture in response to an amount of the stoichiometric mixture in the gas storage unit being below a first threshold.

7. The method of claim 1, wherein the injecting the liquid fuel includes reducing a fuel pulse width of a liquid fuel when the amount of the stoichiometric mixture injected is increased, and increasing the fuel pulse width of the liquid fuel when the amount of the stoichiometric mixture injected is reduced.

8. The method of claim 1, wherein the injecting the liquid fuel includes retarding fuel injection timing of the liquid fuel as the amount of the stoichiometric mixture injected is increased and advancing the fuel injection timing of the liquid fuel as the amount of the stoichiometric mixture injected is reduced.

9. The method of claim 1, wherein the generating includes supplying the water from a windshield washer solvent stored in a windshield washer solvent storage unit.

10. A method for starting a vehicle engine having a plurality of cylinders, comprising:
generating diatomic hydrogen gas and diatomic oxygen gas by electrolysis of water by an onboard electrolyzer;
maintaining a stoichiometric combination of the diatomic hydrogen gas and the diatomic oxygen gas together as a gaseous mixture in a pipe system connected to the electrolyzer;
under some engine operating conditions, delivering the gaseous mixture from the electrolyzer to a gas storage unit via the pipe system;
injecting the gaseous mixture to at least one cylinder of the vehicle engine during an engine start; and
injecting a liquid fuel during the engine start, wherein the injecting includes retarding a spark timing as the amount of the gaseous mixture injected is increased, and advancing the spark timing as the amount of the gaseous mixture injected is reduced.

11. The method of claim 10, further comprising storing the gaseous mixture in the gas storage unit, wherein the gas storage unit is a pressurized container enhanced with adsorptive storage.

12. The method of claim 11, wherein the generating includes generating the diatomic hydrogen gas and the diatomic oxygen gas when an amount of the gaseous mixture in the gas storage unit is below a predetermined low threshold.

13. The method of claim 10, wherein the injecting includes injecting the gaseous mixture to at least one cylinder of the vehicle engine positioned with a piston, and intake and exhaust valves on a power stroke before engine rotation of a direct start.

14. The method of claim 10, wherein the generating includes generating the diatomic hydrogen gas and the diatomic oxygen gas under pressure in the electrolyzer, and maintaining the diatomic hydrogen gas and the diatomic oxygen gas under pressure in the pipe system and the gas storage unit.

15. The method of claim 10, further comprising injecting the liquid fuel, wherein the injecting includes reducing a fuel pulse width of the liquid fuel when an amount of the injected gaseous mixture is increased during the engine start, and increasing the fuel pulse width of the liquid fuel when the amount of the gaseous mixture injected is reduced during the engine start.

16. The method of claim 10, further comprising injecting the liquid fuel during the engine start, wherein the injecting includes retarding a fuel injection timing of the liquid fuel as the amount of the infected gaseous mixture is increased, and advancing the fuel injection timing of the liquid fuel as the amount of the infected gaseous mixture is reduced.

17. A method for direct starting a vehicle engine having a plurality of cylinders, comprising:
generating diatomic hydrogen gas and diatomic oxygen gas by electrolysis of water by an onboard electrolyzer;
maintaining a stoichiometric combination of the diatomic hydrogen gas and the diatomic oxygen gas together as a gaseous mixture in a pipe system connected to the electrolyzer;
delivering the gaseous mixture from the electrolyzer to a gas storage unit via the pipe system when an amount of the gaseous mixture stored in the gas storage unit is below a predetermined low threshold;
delivering the gaseous mixture from the electrolyzer to the engine via the pipe system when the amount of the gaseous mixture in the gas storage unit is above a predetermined high threshold and direct start conditions are met;
adjusting one or more of a fuel pulse width of a liquid fuel type, a fuel injection timing of one or more of the liquid fuel type and the gaseous mixture, and a spark timing based on an amount of injected gaseous mixture, wherein the fuel pulse width is reduced, fuel injection timing is retarded, and spark timing is retarded as the amount of the injected gaseous mixture is increased; and
injecting the gaseous mixture to at least one cylinder of the engine positioned on a power stroke before a first combustion event from engine off during a direct start.

* * * * *